United States Patent
Mallapura Mallikarjunaiah et al.

(10) Patent No.: US 12,375,266 B2
(45) Date of Patent: Jul. 29, 2025

(54) SYSTEM AND METHOD FOR QUANTUM RESISTANT KEY DISTRIBUTION FOR SECURING GTP TRAFFIC

(71) Applicant: Cisco Technology, Inc., San Jose, CA (US)

(72) Inventors: Niranjan Mallapura Mallikarjunaiah, Bengaluru (IN); Vijay Kumar Kothamasu, Bangalore (IN); Khaja Nayab Rasool, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 289 days.

(21) Appl. No.: 18/136,651

(22) Filed: Apr. 19, 2023

(65) Prior Publication Data
US 2024/0356731 A1    Oct. 24, 2024

(51) Int. Cl.
*H04L 9/08* (2006.01)
*H04L 9/40* (2022.01)

(52) U.S. Cl.
CPC .......... *H04L 9/0819* (2013.01); *H04L 9/0852* (2013.01); *H04L 9/0869* (2013.01); *H04L 63/0428* (2013.01)

(58) Field of Classification Search
CPC .................................................. H04L 9/0819
See application file for complete search history.

(56) References Cited

U.S. PATENT DOCUMENTS

| | | | | |
|---|---|---|---|---|
| 8,140,845 | B2 * | 3/2012 | Buddhikot | H04L 63/08 713/168 |
| 8,837,741 | B2 * | 9/2014 | Hawkes | H04L 63/067 380/283 |
| 11,233,628 | B2 * | 1/2022 | Figueira | H04L 9/0668 |
| 11,469,889 | B1 | 10/2022 | Balmakhtar et al. | |
| 2010/0153706 | A1 * | 6/2010 | Haddad | H04L 9/0662 713/153 |
| 2017/0155510 | A1 * | 6/2017 | Cloostermans | H04L 9/0847 |
| 2020/0169416 | A1 * | 5/2020 | Gouget | H04L 9/0877 |
| 2022/0150059 | A1 | 5/2022 | Tanaka et al. | |

FOREIGN PATENT DOCUMENTS

| | | |
|---|---|---|
| CN | 111130705 A | 5/2020 |
| WO | WO2021013317 A1 | 1/2021 |

OTHER PUBLICATIONS

Arul, Rajakumar, "A Quantum-safe Key Hierarchy and Dynamic Security Association for LTE/SAE in 5G Scenario," IEEE, 2019, 9 pages.

* cited by examiner

*Primary Examiner* — Simon P Kanaan
(74) *Attorney, Agent, or Firm* — Lee & Hayes, P.C.

(57) ABSTRACT

Techniques and architecture are described for securing traffic between nodes of a network against quantum computing attacks. For example, a first node of a network generates a random number input string and provides the random number input string to a second node. The first node may use the random number input string to generate at least one first key and an associated identifier. The first node may forward the associated identifier to the second node. Using the random number input string, the second node may generate at least one second key. Based at least in part on the associated identifier, the second node may select the at least one second key as a common encryption key. The at least one second key and the at least one first key are identical. Based at least in part on the common encryption key, the nodes may encrypt and decrypt traffic between them.

20 Claims, 4 Drawing Sheets

SYSTEM AND METHOD FOR QUANTUM RESISTANT KEY DISTRIBUTION FOR SECURING GTP TRAFFIC

TECHNICAL FIELD

The present disclosure relates generally to securing traffic between nodes of a network against quantum computing attacks, and more particularly, to securing general packet radio service (GPRS) tunneling protocol (GTP)-C and GTP-U traffic between evolved packet core (EPC) nodes against quantum computing attacks.

BACKGROUND

Quantum computing exploits quantum mechanical phenomena. At small scales, physical matter exhibits properties of both particles and waves and quantum computing leverages this behavior using specialized hardware. A scalable quantum computer may perform some calculations exponentially faster than any modern "classical" computer. In particular, a large-scale quantum computer may break widely used encryption schemes.

General packet radio service (GPRS) tunneling protocol (GTP) is a group of internet protocol (IP)-based communication protocols used to carry packet data within global system for mobile telecommunications (GSM), universal mobile telecommunications system (UMTS), and long term evolution (LTE) networks, for example. Generally, GTP is a set of three separate protocols: GTP controllable (GTP-C), GTP user (GTP-U), and GTP prime. GTP-U carries user data tunnels within the GPRS core network and between the radio access network and core network.

GTP uses user datagram protocol (UDP) to communicate between network nodes. This protocol does not have methods for sender authentication and encryption, which exposes security vulnerabilities such as, for example, message spoofing (which may be used for fraud and impersonation attacks), denial-of-service (DOS) attacks on a network (which results in disruption of mobile communication), and invasion of privacy (which results in disclosure of subscriber information over open communication channels).

The GSM Association provides recommendations for operators to detect and prevent attacks using GTP-U user plane data on the network, services, and applications, as well as to address the threat posed by malware and vulnerabilities. However, mobile operators are experiencing an increase in the number of attacks that are exploiting vulnerabilities by abusing GTP based interfaces. This may result in impacting subscribers and carrier-class operators. Such attacks may be more severe where the subscribers are roaming, e.g., the subscribers are accessing their services using a different mobile network than the mobile network with which they have subscribed. Attackers may eavesdrop on communications within the mobile network to, for example, harvest network information, harvest subscriber information, and perform criminal activity enabled by the exfiltration of confidential data.

Currently attempts have been made to provide more security within mobile networks. One example includes a zone-based policy firewall. Another example includes stateful deep packet inspection firewall. A third example includes IP security (Sec) tunnels between evolved packet core (EPC) end points. However, none of these methods provide security against quantum computing and thus cannot secure GTP traffic between EPC end points with respect to quantum computing. Thus, there are no methods to provide quantum resistant key distribution and thereby secure GTP traffic between EPC nodes, which is a key requirement in mobile networks, especially for cellular cloud deployments

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
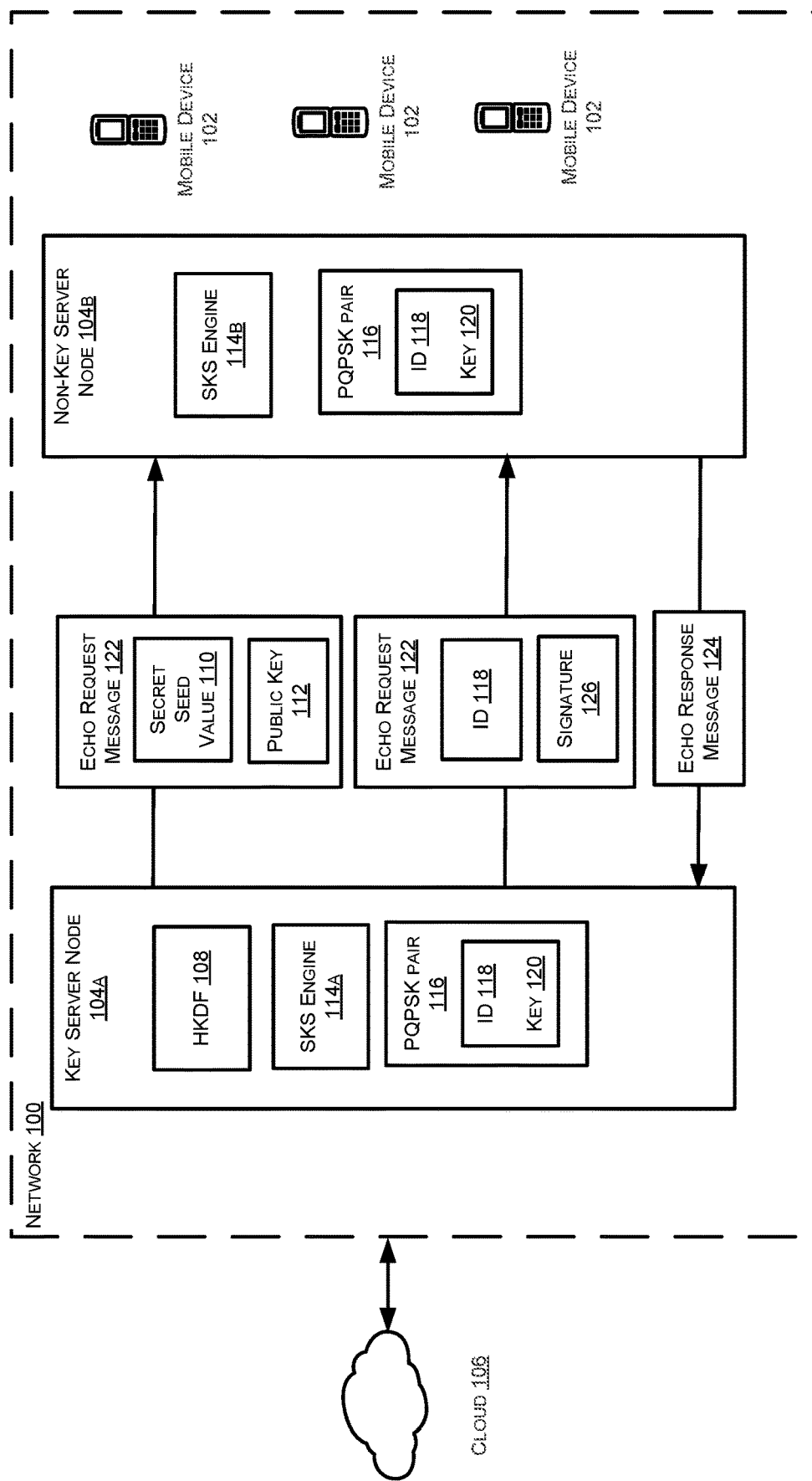
FIG. 1 schematically illustrates a portion of an example network arrangement for securing traffic between nodes of a network against quantum computing attacks, in accordance with techniques and architecture described herein.

The present disclosure provides techniques and architecture for securing traffic between nodes of a network against quantum computing attacks, and more particularly, to securing general packet radio service (GPRS) tunneling protocol (GTP)-C and GTP-U traffic between evolved packet core (EPC) nodes against quantum computing attacks securing GTP-C and GTP-U traffic between EPC nodes against quantum computing attacks. In particular, the techniques and architecture utilize an EPC node as a key server node to distribute shared secret seed values and a post-quantum identifier (PQPSQ ID) to another EPC node (non-key server node).

Post-quantum cryptography is critical for mobile security in view of quantum computing. The National Institute of Standards and Technology (NIST) is trying to determine post-quantum cryptography (PQC) standards for mobile security. NIST is designing PQC algorithms as "drop-and replacement" for Rivest-Shamir-Adleman (RSA) and elliptic-curve cryptography (ECC). However, there are many challenges with respect to public-key size, signature size, alternative auxiliary functions, certificate authority (CA) infrastructure, etc. Candidates for PQC algorithms include lattice-based algorithms, coding-based algorithms, multivariate algorithms, stateless hash-based signatures, and super singular elliptic curve isogeny-based algorithms. The techniques and architecture described herein utilize a quantum resistant key distribution for GTP traffic between EPC nodes and GSM/UMTS/LTE mobile network deployments. For generating quantum resistant keys (also known as post-quantum pre-shared keys (PQPSKs)), a session key service (SKS) may be used. However, other key services such as quantum key distribution (QKD) service or standard PQC service may be used for providing quantum security to GSM/UMTS/LTE mobile network deployments by generating quantum resistant keys.

As an example, a first node of a network may use a hash-based message authentication code (HMAC) key derivation function (HKDF) to generate a unique "secret seed value." The secret seed value may be provided with a public key to a second node of the network. The first node may initialize a local session key service (SKS) engine with the secret seed value. As previously noted, a session key service may be used but other services such as, for example, QKD service or PQC service may be used. The second node also initializes a local session key service engine with the received secret seed value.

The first node may use the session key service engine to generate a PQPSK pair (including an identifier (ID) and a key) and share the PQPSK ID with the second node via an echo request message. The second node may fetch the PQPSK ID from the message and then generate the corresponding PQPSK key using the local session key service engine based on the PQPSK ID. In configurations, the second node may provide a status update to the first node. The steps may be repeated if the status message from the second node indicates failure. However, when the second node is successful, both the first node and the second node will have a common PQPSK key (common encryption key) which may be used to encrypt traffic between the two nodes. The PQPSK key may also be used to encrypt information elements (IEs) within messages. In configurations, during message exchange between the two nodes, a bit IE may be utilized to specify encryption granularity such as, for example, whether the message payload has been encrypted with the PQPSK key, one or more information elements have been encrypted with the PQPSK key, or just the user plane.

For example, a method may include generating, by a first node of a network, a random number input string. The first node may forward the random number input string to a second node of the network. The first node may use the random number input string to generate at least one first key and an associated identifier. The first node may forward the associated identifier to the second node. Using the random number input string, the second node may generate at least one second key. Based at least in part on the associated identifier, the second node may select the at least one second key as a common encryption key, wherein the at least one second key and the at least one first key are identical. Based at least in part on the common encryption key, the first node may encrypt traffic destined for the second node and based at least in part on the common encryption key, the second node may decrypt traffic received from the first node. Based at least in part on the common encryption key, the second node may encrypt traffic destined for the first node and based at least in part on the common encryption key, the first node may decrypt traffic received from the second node.

Example Embodiments

In accordance with configurations described herein, as previously noted, the present disclosure provides techniques and architecture for securing traffic between nodes of a network against quantum computing attacks, and more particularly, to securing general packet radio service (GPRS) tunneling protocol (GTP)-C and GTP-U traffic between evolved packet core (EPC) nodes against quantum computing attacks securing GTP-C and GTP-U traffic between EPC nodes against quantum computing attacks. In particular, the techniques and architecture utilize an EPC node as a key server node to distribute shared secret seed values and a post-quantum identifier (PQPSQ ID) to another EPC node (non-key server node).

Post-quantum cryptography is critical for mobile security in view of quantum computing. The National Institute of Standards and Technology (NIST) is trying to determine post-quantum cryptography (PQC) standards for mobile security. NIST is designing PQC algorithms as "drop-and replacement" for Rivest-Shamir-Adleman (RSA) and elliptic-curve cryptography (ECC). However, there are many challenges with respect to public-key size, signature size, alternative auxiliary functions, certificate authority (CA) infrastructure, etc. Candidates for PQC algorithms include lattice-based algorithms, coding-based algorithms, multivariate algorithms, stateless hash-based signatures, and super singular elliptic curve isogeny-based algorithms. The techniques and architecture described herein utilize a quantum resistant key distribution for GTP traffic between EPC nodes and GSM/UMTS/LTE mobile network deployments. For generating quantum resistant keys (also known as post-quantum pre-shared keys (PQPSKs)), a session key service (SKS) may be used. However, other key services such as quantum key distribution (QKD) service or standard PQC service may be used for providing quantum security to GSM/UMTS/LTE mobile network deployments by generating quantum resistant keys.

As an example, a first node of a network may use a hash-based message authentication code (HMAC) key derivation function (HKDF) to generate a unique "secret seed value." The secret seed value may be provided with a public key to a second node of the network. The first node may initialize a local session key service (SKS) engine with the secret seed value. As previously noted, a session key service may be used but other services such as, for example, QKD service or PQC service may be used. The second node also initializes a local session key service engine with the received secret seed value.

The first node may use the session key service engine to generate a PQPSK pair (including an identifier (ID) and a key) and share the PQPSK ID with the second node via an echo request message. The second node may fetch the PQPSK ID from the message and then generate the corresponding PQPSK key using the local session key service engine based on the PQPSK ID. In configurations, the second node may provide a status update to the first node. The steps may be repeated if the status message from the second node indicates failure. However, when the second node is successful, both the first node and the second node will have a common PQPSK key (common encryption key) which may be used to encrypt traffic between the two nodes. The PQPSK key may also be used to encrypt information elements (IEs) within messages. In configurations, during message exchange between the two nodes, a bit IE may be utilized to specify encryption granularity such as, for example, whether the message payload has been encrypted with the PQPSK key, one or more information elements have been encrypted with the PQPSK key, or just the user plane.

More particularly, the techniques and architecture described herein provide a quantum resistant method for securing traffic, e.g., GTP-C and GTP-U traffic, between nodes of a network, e.g., EPC nodes of a GTP network. In configurations, one of the EPC nodes acts as a key server node to distribute a shared secret seed value, e.g., random number input string, and a post-quantum pre-shared key identifier (PQPSK ID) to another node, e.g., echo request and echo response messages may be used to exchange a node features information element (IE) between EPC nodes. The node features IE can be extended to carry the shared secret seed value from the key server to the non-key server node.

In configurations, a hash-based message authentication code (HMAC) key derivation function (HKDF) may be used to generate the unique secret seed value (random number input string) on the key server node. In configurations, the secret seed value may be encrypted with the public key of the non-key server node to generate a cypher-text and the cypher-text is sent to the non-key server node. In configurations, the non-key server node decrypts the cypher-text using its private key and populates back the secret seed value. Now both the key server node and the non-key server node have the common secret seed value, which is used by the quantum cryptography method to generate unique pairs of PQPSK (ID, key).

In configurations, node features may be extended to carry PQPSK ID and PQPSK status between the EPC nodes, e.g., the key server node and the non-key server node. The node features IE can also be extended to indicate different encryption methods for GTP-C message level encryption, GTP-C IE level encryption, and GTP-U message level encryption. If IE level encryption is required, then in configurations, a list of IEs to be encrypted may also be exchanged in node features.

In configurations, to avoid a DOS attack on the PQPSK ID, the key server node may include some authentication information, e.g., a signature, along with the PQPSK ID generated by a quantum key distribution module, for example, a SKS engine, QKD engine, or a PQC engine. The authentication (signature) may be signed on the PQPSK ID by the key server node using a private key, which may be stored securely on the, for example, the secure unique device identifier (SUDI), anti-counterfeit technology (ACT2), trust anchor module (TAM) chip of the key server node, which is tamper proof. The quantum key distribution module on the key server node generates the PQPSK ID and the PQPSK key pair, which is unique per device. The key server node may generate the signature by signing the PQPSK ID using its private key and include that signature also as part of the PQPSK ID threshold limit value (TLV).

In configurations, the key server node thus generates the unique PQPSK (ID, key) pair and sends only the PQPSK ID to the non-key server node. In configurations, the PQPSK ID may also be signed with the signature. The non-key server node receives the PQPSK ID from the key server node. The non-key server node fetches the PQPSK ID from the message. In configurations, the non-key server node independently generates the PQPSK key independently based on the received PQPSK ID. The non-key server node may utilize a local quantum key distribution module to generate the PQPSK key. In configurations, both the key server node and the non-key server node may generate multiple PQPSK keys with corresponding PQPSK IDs. Based on the PQPSK ID, both the key server node and the non-key server node have the same PQPSK key, which can be used as a common encryption key to encrypt GTP traffic between EPC nodes, e.g., the key server node and the non-key server node.

The quantum resistant method described herein may utilize the common encryption key for GTP-C message level encryption. GTP-C information element (IE) level encryption, and GTP-U message level encryption. Spare bits defined in the GTP-C header may be used to indicate whether message level encryption is used or if IE level encryption is used.

In the case of GTP-C/GTP-U message level encryption, a sender EPC node indicates the payload of a message is encrypted at the message level, e.g., the payload of the message is encrypted. When sending out the message over a GTP-C/GTP-U interface, the EPC node sets the message encryption flag in the GTP-C/GTP-U header and encrypts the encoded payload of the GTP-C/GTP-U message using the common encryption key presented using the PQPSK (ID, key) exchanged earlier in the node features IE of echo request and echo response messages. When receiving the message over the GTP-C/GTP-U interface, a receiving EPC node checks the message encryption flag in the GTP-C/GTP-U header. If the flag is set, then the receiving EPC node decrypts the payload of the message using its PQPSK key derived using the PQPSK ID negotiated earlier and decodes the received GTP-C/GTP-U message. Thus, the sending EPC node uses the common encryption key generated using the PQPSK ID to encrypt the message and the receiving EPC node uses the same common encryption key generated using the PQPSK ID to decrypt the message.

In the case of GTP-C IE level encryption, in the GTP-C message header the sender EPC node indicates the message is encrypted at the IE level. When sending out the message over the GTP-C interface, the EPC node sets the IE encryption flag in the GTP-C header and encrypts the value of the IE, which are exchanged in node features using the PQPSK key derives using the PQPSK ID negotiated earlier using the echo request and echo response messages. When receiving the message over the GTP-C interface, the receiving EPC node checks the IE encryption flag in the GTP-C header. If the flag is set, then the receiving EPC node decrypts the values of IE that are exchanged in node features using the PQPSK key derived using the PQPSK ID to decrypt the message. Thus, the sending EPC node uses the common encryption key (generated using the PQPSK ID) to encrypt the message and the receiving EPC node uses the same common encryption key (generated using the PQPSK ID) to decrypt the message. In configurations, the payload of the message may also be encrypted by the sending EPC node using the common encryption key. Thus, the receiving EPC node may decrypt the payload of the message using the common encryption key.

Accordingly, in configurations, a method includes generating, by a first node of a network, a random number input string. The first node may forward the random number input string to a second node of the network. The first node may use the random number input string to generate at least one first key and an associated identifier. The first node may forward the associated identifier to the second node. Using the random number input string, the second node may generate at least one second key. Based at least in part on the associated identifier, the second node may select the at least one second key as a common encryption key, wherein the at least one second key and the at least one first key are identical. Based at least in part on the common encryption key, the first node may encrypt traffic destined for the second node and based at least in part on the common encryption key, the second node may decrypt traffic received from the first node. Based at least in part on the common encryption key, the second node may encrypt traffic destined for the first node and based at least in part on the common encryption key, the first node may decrypt traffic received from the second node.

In configurations, the method may further comprise encrypting, by the first node using a public key of a second node, the random number input string and decrypting, by the second node using a private key of the second node, the random number input string. In configurations, the first node may sign, using a private key of the first node, the associated identifier with the signature. The method may further comprise validating, by the second node using a public key of the first node, the signature.

In configurations, the network may be configured as a general packet radio service (GPRS) tunneling protocol (GTP) network.

In configurations, the method may further comprise setting a flag in a header of a message, by the first node, wherein the flag indicates that a payload of the message is encrypted. The method may further comprise forwarding, by the first node to the second node, the message. The method may further comprise determining by the second node that the flag is set and based at least in part on determining that the flag is set decrypting, by the second node, the payload of the message.

In configurations, the method may further comprise encrypting, by the first node using the common encryption key one or more information elements of a message. The method may also comprise setting a flag in a header of the message, by the first node, wherein the flag indicates that the one or more information elements of the message are encrypted and forwarding, by the first node to the second node, the message. The method may further comprise determining, by the second node, that the flag is set and based at least in part on determining that the flag is set, decrypting, by the second node using the common encryption key, the one or more information elements of the message. In such configurations, the method may further comprise encrypting by the first node using the common encryption key, a payload of the message. Based at least in part on decrypting the one or more information elements of the message, the second node may decrypt the payload of the message using the common encryption key.

In configurations, the method may use the random number input string to generate, by the first node, at least one first key and the associated identifier comprises generating, by the first node, multiple first keys and associated identifiers. Also, in configurations, the random number input string may be used to generate, by the second node, at least one second key and the associated identifier comprises generating, by the second node, multiple second keys and associated identifications.

In configurations, a system comprises one or more processors and one or more non-transitory computer-readable media storing computer-executable instructions that, when executed by the one or more processors, cause the one or more processors to perform actions comprising one or more of the steps of the methods described above.

Thus, the techniques and architecture described herein provide a quantum resistant way to generate and share pre-shared keys between EPC nodes. The EPC nodes have more control in selecting messages to encrypt and the EPC nodes have more control in selecting IEs to encrypt. This may significantly reduce CPU requirements as only a few important messages are encrypted and only important IEs are encrypted. The encryption/decryption mechanism may be embedded in the GTP-C/GTP-U protocol, which increases interoperability between different vendors.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates a portion of an example network 100 that includes mobile devices 102 that accesses the network 100 for services. As is known, in configurations, multiple mobile devices access the network 100. In configurations, other electronic devices may access the network 100. In configurations, the network 100 is configured as a general packet radio service (GPRS) tunneling protocol (GTP) network. GTP is a group of internet protocol (IP)-based communication protocols used to carry packet data within global system for mobile telecommunications (GSM), universal mobile telecommunications system (UMTS), and long term evolution (LTE) networks, for example. Generally, GTP is a set of three separate protocols: GTP controllable (GTP-C), GTP user (GTP-U), and GTP prime. GTP-U carries user data tunnels within the GPRS core network and between the radio access network and core network. In such configured networks, GTP-C and GTP-U traffic moves between nodes 104, e.g., nodes 104a, 104b, configured as evolved packet core (EPC) nodes. Examples of such EPC nodes include, for example, home subscriber server (HSS), packet data node gateway (PGW), serving gateway (SGW), mobility management entity (MME), policy and charging rules function (PCRF), access network discovery and selection function (ANDSF), evolved packet data gateway (ePDG), etc. While the techniques and architecture are described herein primarily with respect to GTP configured networks, the techniques and architecture are applicable and may be used with any type of network that includes nodes that have traffic moving among the nodes. In configurations, the mobile device 102 may communicate with other devices via the network 100 and may access, for example, other networks (not shown), the Cloud 106, etc., via the network 100.

In configurations a first node 104a of the network 100 may serve as a key server node that may use a hash-based message authentication code (HMAC) key derivation function (HKDF) 108 to generate a unique "secret seed value" 110. The secret seed value 110 may be provided with a public key 112 to a second node 104b that is a non-key server node of the network 100. The first node 104a may initialize a local session key service (SKS) engine 114a with the secret seed value 110. As previously noted, a SKS engine 114a may be used but other services such as, for example, QKD service or PQC service may be used. The second node 104b also initializes a local SKS engine 114b with the received secret seed value 110.

The first node 104a may use the SKS engine 114a to generate a PQPSK pair 116 (including an identifier (ID) 118 and a key 120) and share the PQPSK ID 118 with the second node 104b via an echo request message 122. The second node 104b may fetch the PQPSK ID 118 from the message 122 and then generate the corresponding PQPSK key 120 using the local SKS engine 114b based on the PQPSK ID 118. Thus, the second node 104b will now have the PQPSK pair 116 (ID 118 and key 120). In configurations, the second node 104b may provide a status update, e.g., an echo response message 124, to the first node 104a. The steps may be repeated if the status message 124 from the second node 104b indicates failure. However, when the second node 104b is successful, both the first node 104a and the second node 104b will have a common PQPSK key 120 (common encryption key) which may be used to encrypt traffic between the two nodes 104a, 104b. The PQPSK key 120 may also be used to encrypt information elements (IEs)

within messages. In configurations, during message exchange between the two nodes 104a, 104b, a bit IE may be utilized to specify encryption granularity such as, for example, whether the message payload has been encrypted with the PQPSK key 120, one or more information elements have been encrypted with the PQPSK key, or just the user plane.

More particularly, the techniques and architecture described herein provide a quantum resistant method for securing traffic, e.g., GTP-C and GTP-U traffic, between nodes of a network, e.g., EPC nodes of a GTP network. In configurations, one of the EPC nodes 104. e.g., node 104a, acts as a key server node to distribute a shared secret seed value, e.g., random number input string, and a post-quantum pre-shared key identifier (PQPSK ID 118) to another node, e.g., non-key server node 104b. Echo request messages 122 and echo response messages 124 may be used to exchange a node features information element (IE) between EPC nodes. The node features IE can be extended to carry the secret seed value 110 and/or the PQPSK ID 118 from the key server node 104a to the non-key server node 104b.

In configurations, the hash-based message authentication code (HMAC) key derivation function (HKDF) 108 may be used to generate the unique secret seed value (random number input string) 110 on the key server node 104a. In configurations, the secret seed value 110 may be encrypted with the public key 112 of the non-key server node 104b to generate a cypher-text and the cypher-text is sent to the non-key server node 104b. In configurations, the non-key server node 104b decrypts the cypher-text using its private key and populates back the secret seed value 110. Now both the key server node 104a and the non-key server node 104b have the common secret seed value 110, which is used by the quantum cryptography method to generate unique pairs 116 of PQPSK (ID 118, key 120).

In configurations, node features may be extended to carry PQPSK ID 118 and PQPSK status between the EPC nodes, e.g., the key server node 104a and the non-key server node 104b. The node features IE can also be extended to indicate different encryption methods for GTP-C message level encryption. GTP-C IE level encryption, and GTP-U message level encryption. If IE level encryption is required, then in configurations, a list of IEs to be encrypted may also be exchanged in node features IEs.

In configurations, to avoid a DOS attack on the PQPSK ID 118, the key server node 104a may include some authentication information, e.g., a signature 126, along with the PQPSK ID 118 generated by the quantum key distribution module, for example, the SKS engine 114a. QKD engine, or a PQC engine. The authentication (signature 126) may be signed on the PQPSK ID 118 by the key server node 104b using a private key, which may be stored securely on, for example, a secure unique device identifier (SUDI), anti-counterfeit technology (ACT2), trust anchor module (TAM) chip of the key server node 104b, which is tamper proof. The SKS engine 114a on the key server node 104b generates the PQPSK ID 118 and the PQPSK key pair 116, which is unique per device. The key server node 104a may generate the signature 126 by signing the PQPSK ID 118 using its private key and include that signature 126 also as part of the PQPSK ID threshold limit value (TLV).

In configurations, the key server node 104a thus generates the unique PQPSK (ID 118, key 120) pair 116 and sends only the PQPSK ID 118 to the non-key server node 104b. In configurations, the PQPSK ID 118 may also be signed with the signature 126. The non-key server node 104b receives the PQPSK ID 118 from the key server node 104a. The non-key server node 104b fetches the PQPSK ID 118 from the echo request message 122. In configurations, the non-key server node 104b independently generates the PQPSK key 120 independently based on the received PQPSK ID 118. The non-key server node 104b may utilize a local quantum key distribution module, e.g., SKS engine 114b, to generate the PQPSK key 120. In configurations, both the key server node 104a and the non-key server node 104b may generate multiple PQPSK keys 120 with corresponding PQPSK IDs 118 using the secret seed value 110. Based on the PQPSK ID 118, both the key server node 104a and the non-key server node 104b have the same PQPSK key 120, which can be used as a common encryption key to encrypt GTP traffic between EPC nodes, e.g., the key server node 104a and the non-key server node 104b.

The quantum resistant method described herein may utilize the common encryption key for GTP-C message level encryption, GTP-C information element (IE) level encryption, and GTP-U message level encryption. Spare bits defined in the GTP-C header may be used to indicate whether message level encryption is used or if IE level encryption is used.

In the case of GTP-C/GTP-U message level encryption, a sender EPC node indicates the payload of a message is encrypted at the message level, e.g., the payload of the message is encrypted. When sending out the message over a GTP-C/GTP-U interface, the EPC node sets the message encryption flag in the GTP-C/GTP-U header and encrypts the encoded payload of the GTP-C/GTP-U message using the common encryption key presented using the PQPSK pair 116 (ID 118, key 120) exchanged earlier in the node features IE of echo request and echo response messages. When receiving the message over the GTP-C/GTP-U interface, a receiving EPC node checks the message encryption flag in the GTP-C/GTP-U header. If the flag is set, then the receiving EPC node decrypts the payload of the message using its PQPSK key 120 derived using the PQPSK ID 118 negotiated earlier and decodes the received GTP-C/GTP-U message. Thus, the sending EPC node uses the common encryption key 120 generated using the PQPSK ID 118 to encrypt the message and the receiving EPC node uses the same common encryption key 120 generated using the PQPSK ID 118 to decrypt the message.

In the case of GTP-C IE level encryption, in the GTP-C message header the sender EPC node indicates the message is encrypted at the IE level. When sending out the message over the GTP-C interface, the EPC node sets the IE encryption flag in the GTP-C header and encrypts the value of the IE, which are exchanged in node features using the PQPSK key derives using the PQPSK ID 118 negotiated earlier using the echo request message 122 and echo response message 124. When receiving the message over the GTP-C interface, the receiving EPC node checks the IE encryption flag in the GTP-C header. If the flag is set, then the receiving EPC node decrypts the values of IE that are exchanged in node features using the PQPSK key 120 derived using the PQPSK ID 118 to decrypt the message. Thus, the sending EPC node uses the common encryption key 120 (generated using the PQPSK ID 118) to encrypt the message and the receiving EPC node uses the same common encryption key 120 (generated using the PQPSK ID 118) to decrypt the message. In configurations, the payload of the message may also be encrypted by the sending EPC node using the common encryption key 120. Thus, the receiving EPC node may decrypt the payload of the message using the common encryption key 120.

As previously noted, in configurations, both the key server node 104a and the non-key server node 104b may generate multiple PQPSK keys 120 with corresponding PQPSK IDs 118 using the secret seed value 110. Thus, the key-server node 104a may periodically change the PQPSK value 120 by periodically sending a different PQPSK ID 118 to the non-key server node 104b.

Figure 2:
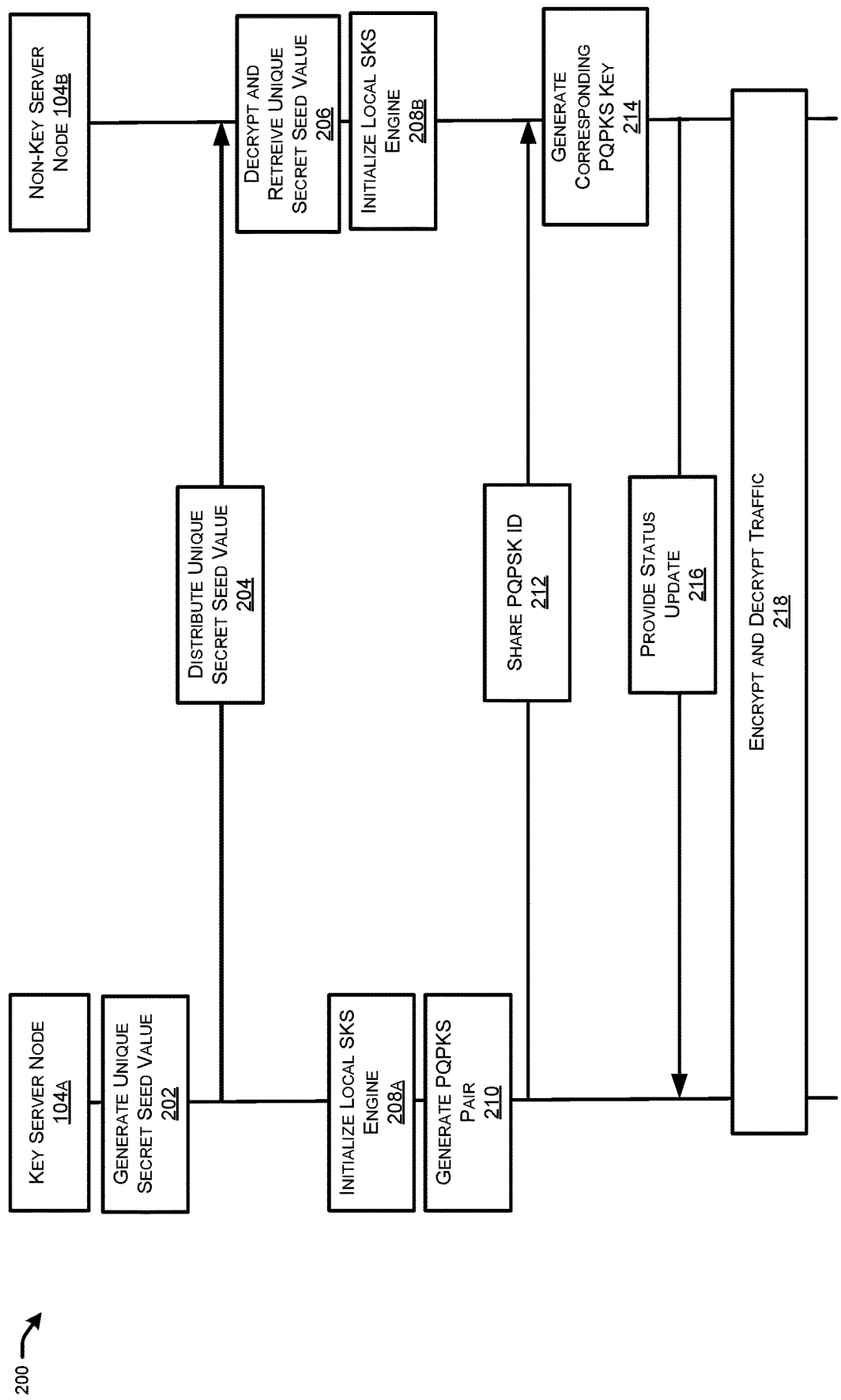
FIG. 2 schematically illustrates an example flow for the example network arrangement of FIG. 1, in accordance with techniques and architecture described herein.

FIG. 2 schematically illustrates an example flow 200 for the example network 100. At 202, the EPC node 104a acts as a key server node and uses the hash-based message authentication code (HMAC) key derivation function (HKDF) 108 to generate the unique secret seed value (random number input string) 110 on the key server node 104a. In configurations, the secret seed value 110 may be encrypted with the public key 112 of the non-key server node 104b to generate a cypher-text and the cypher-text is sent to the non-key server node 104b. In configurations, to avoid a DOS attack on the PQPSK ID 118, the key server node 104a may include some authentication information, e.g., a signature 126, along with the PQPSK ID 118 generated by the quantum key distribution module, for example, the SKS engine 114a, QKD engine, or a PQC engine. The authentication (signature 126) may be signed on the PQPSK ID 118 by the key server node 104b using a private key, which may be stored securely on, for example, a secure unique device identifier (SUDI), anti-counterfeit technology (ACT2), trust anchor module (TAM) chip of the key server node 104b, which is tamper proof. The SKS engine 114a on the key server node 104b generates the PQPSK ID 118 and the PQPSK key pair 116, which is unique per device. The key server node 104a may generate the signature 126 by signing the PQPSK ID 118 using its private key and include that signature 126 also as part of the PQPSK ID threshold limit value (TLV).

At 204, the EPC node 104a distributes the shared secret seed value, e.g., random number input string, and a post-quantum pre-shared key identifier (PQPSK ID 118) to another node, e.g., an echo request message 122 and echo response message 124, may be used to exchange a node features information element (IE) between EPC nodes 104a, 104b. The node features IE can be extended to carry the shared secret seed value 110 from the key server node 104a to the non-key server node 104b.

At 206, the non-key server node 104b decrypts the cypher-text using its private key and populates back the secret seed value 110. Now both the key server node 104a and the non-key server node 104b have the common secret seed value 110, which is used by the quantum cryptography method to generate unique pairs 116 of PQPSK (ID 118, key 120).

At 208a, the first node 104a may initialize the local SKS engine 114a with the secret seed value 110, while at 208b, the second node 104b may initialize the local SKS engine 114b with the secret seed value 110. As previously noted, a SKS engine 114a, 114b may be used but other services such as, for example, QKD service or PQC service may be used.

At 210, the first node 104a may use the SKS engine 114a to generate the PQPSK pair 116 (including an identifier (ID) 118 and a key 120) and at 212 share the PQPSK ID 118 with the second node 104b via the echo request message 122.

At 214, the second node 104b may fetch the PQPSK ID 118 from the message 122 and generate the corresponding PQPSK key 120 using the local SKS engine 114b based on the received PQPSK ID 118. In configurations, at 216, the second node 104b may provide a status update, e.g., the echo response message 124, to the first node 104a. The steps may be repeated if the status message 124 from the second node 104b indicates failure. However, when the second node 104b is successful, both the first node 104a and the second node 104b will have the common PQPSK key 120 (common encryption key).

Figure 3:
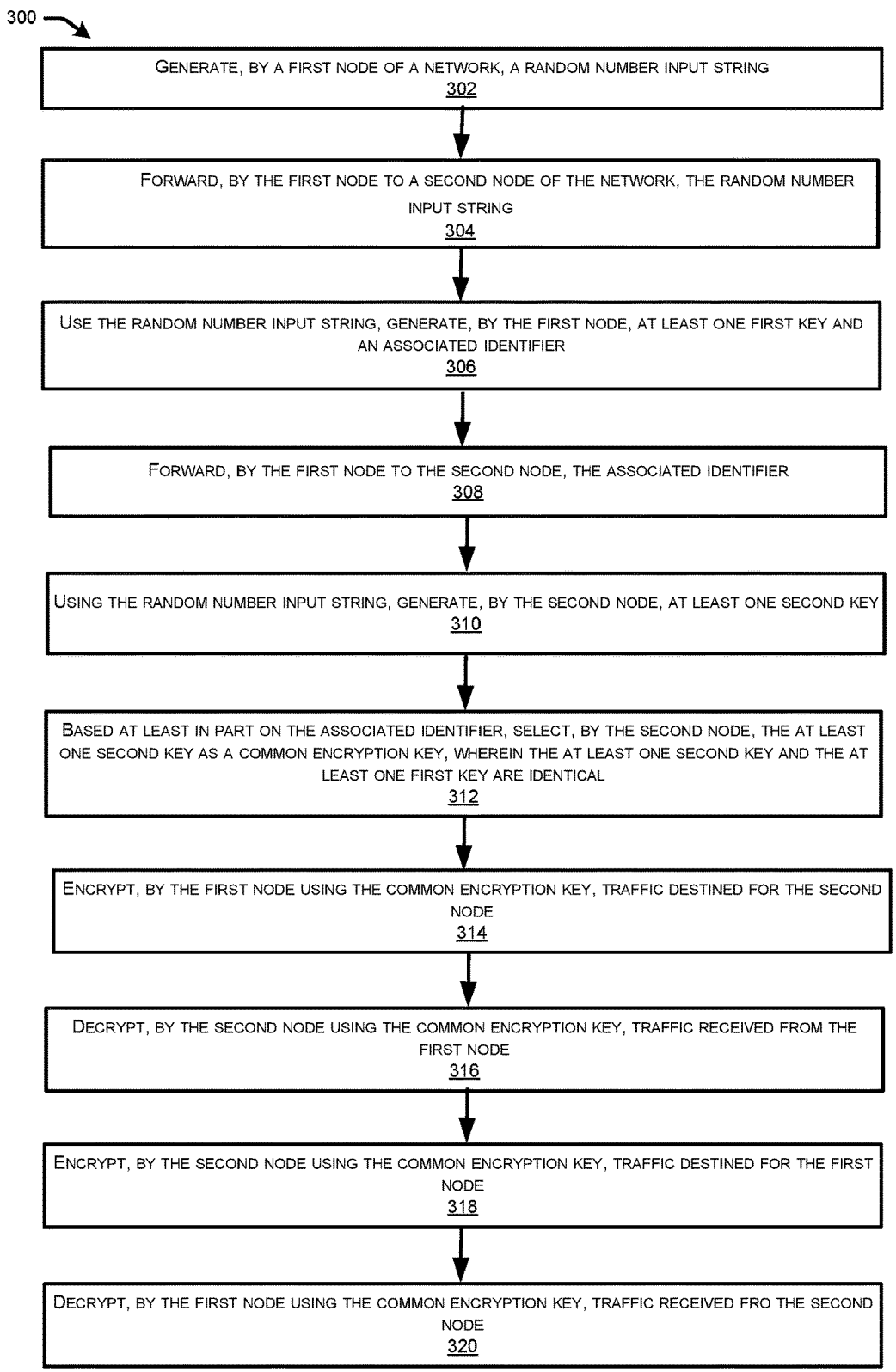
FIG. 3 illustrates a flow diagram of an example method for securing traffic between nodes of a network against quantum computing attacks, in accordance with the techniques and architecture described herein.

At 218, the common PQPSK key 120 may be used to encrypt and decrypt traffic between the two nodes 104a, 104b. The PQPSK key 120 may also be used to encrypt and decrypt information elements (IEs) within messages. In configurations, during message exchange between the two nodes 104a, 104b, a bit IE may be utilized to specify encryption granularity such as, for example, whether the message payload has been encrypted with the PQPSK key 120, one or more information elements have been encrypted with the PQPSK key, or just the user plane FIG. 3 illustrates a flow diagram of an example method 300 and illustrates aspects of the functions performed at least partly by devices of a network as described with respect to FIGS. 1 and 2. The logical operations described herein with respect to FIG. 3 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations structural devices, acts, or modules. These operations, structural devices, acts, and modules can be implemented in software, in firmware, in special purpose digital logic, and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 3 illustrates a flow diagram of an example method 300 for securing traffic between nodes of a network against quantum computing attacks. In some examples, the method 300 may be performed by a system comprising one or more processors and one or more non-transitory computer-readable media storing computer-executable instructions that, when executed by the one or more processors, cause the one or more processors to perform the method 300.

At 302, a first node of a network generates a random number input string. At 304, the first node forwards the random number input string to a second node of the network. For example, one of the EPC nodes 104 acts as a key server node to distribute a shared secret seed value, e.g., random number input string, and a post-quantum pre-shared key identifier (PQPSK ID 118) to another node, e.g., an echo request message 122 and echo response message 124 may be used to exchange a node features information element (IE) between EPC nodes. The node features IE can be extended to carry the shared secret seed value 110 from the key server node 104a to the non-key server node 104b.

In configurations, the hash-based message authentication code (HMAC) key derivation function (HKDF) 108 may be used to generate the unique secret seed value (random number input string) 110 on the key server node 104a. In configurations, the secret seed value 110 may be encrypted with the public key 112 of the non-key server node 104b to generate a cypher-text and the cypher-text is sent to the non-key server node 104b. In configurations, the non-key server node 104b decrypts the cypher-text using its private key and populates back the secret seed value 110. Now both the key server node 104a and the non-key server node 104b have the common secret seed value 110, which is used by the quantum cryptography method to generate unique pairs 116 of PQPSK (ID 118, key 120.

In configurations, node features may be extended to carry PQPSK ID 118 and PQPSK status between the EPC nodes, e.g., the key server node 104a and the non-key server node 104b. The node features IE can also be extended to indicate different encryption methods for GTP-C message level encryption. GTP-C IE level encryption, and GTP-U message level encryption. If IE level encryption is required, then in configurations, a list of IEs to be encrypted may also be exchanged in node features IEs.

In configurations, to avoid a DOS attack on the PQPSK ID 118, the key server node 104a may include some authentication information, e.g., a signature 126, along with the PQPSK ID 118 generated by the quantum key distribution module, for example, the SKS engine 114a. QKD engine, or a PQC engine. The authentication (signature 126) may be signed on the PQPSK ID 118 by the key server node 104b using a private key, which may be stored securely on, for example, a secure unique device identifier (SUDI), anti-counterfeit technology (ACT2), trust anchor module (TAM) chip of the key server node 104b, which is tamper proof.

At 306, using the random number input string, the first node generates at least one first key and an associated identifier. At 308, the first node forwards the associated identifier to the second node. At 310, using the random number input string, the second node generates at least one second key. At 312, based at least in part on the associated identifier, the second node selects the at least one second key as a common encryption key, wherein the at least one second key and the at least one first key are identical.

For example, the SKS engine 114a on the key server node 104b generates the PQPSK ID 118 and the PQPSK key pair 116, which is unique per device. The key server node 104a may generate the signature 126 by signing the PQPSK ID 118 using its private key and include that signature 126 also as part of the PQPSK ID threshold limit value (TLV).

In configurations, the key server node 104a thus generates the unique PQPSK (ID 118, key 120) pair 116 and sends only the PQPSK ID 118 to the non-key server node 104b. In configurations, the PQPSK ID 118 may also be signed with the signature 126. The non-key server node 104b receives the PQPSK ID 118 from the key server node 104a. The non-key server node 104b fetches the PQPSK ID 118 from the echo request message 122. In configurations, the non-key server node 104b independently generates the PQPSK key 120 independently based on the received PQPSK ID 118. The non-key server node 104b may utilize a local quantum key distribution module, e.g., SKS engine 114b, to generate the PQPSK key 120. In configurations, both the key server node 104a and the non-key server node 104b may generate multiple PQPSK keys 120 with corresponding PQPSK IDs 118 using the secret seed value 110. Based on the PQPSK ID 118, both the key server node 104a and the non-key server node 104b have the same PQPSK key 120, which can be used as a common encryption key to encrypt GTP traffic between EPC nodes, e.g., the key server node 104a and the non-key server node 104b.

At 314, the first node uses the common encryption key to encrypt traffic destined for the second node. At 316, the second node uses the common encryption key to decrypt traffic received from the first node. At 318, the second node uses the common encryption key to encrypt traffic destined for the first node. At 320, the first node uses the common encryption key to decrypt traffic received from the second node.

For example, the quantum resistant method described herein may utilize the common encryption key for GTP-C message level encryption, GTP-C information element (IE) level encryption, and GTP-U message level encryption. Spare bits defined in the GTP-C header may be used to indicate whether message level encryption is used or if IE level encryption is used.

In the case of GTP-C/GTP-U message level encryption, a sender EPC node indicates the payload of a message is encrypted at the message level, e.g., the payload of the message is encrypted. When sending out the message over a GTP-C/GTP-U interface, the EPC node sets the message encryption flag in the GTP-C/GTP-U header and encrypts the encoded payload of the GTP-C/GTP-U message using the common encryption key presented using the PQPSK pair 116 (ID 118, key 120) exchanged earlier in the node features IE of echo request and echo response messages. When receiving the message over the GTP-C/GTP-U interface, a receiving EPC node checks the message encryption flag in the GTP-C/GTP-U header. If the flag is set, then the receiving EPC node decrypts the payload of the message using its PQPSK key 120 derived using the PQPSK ID 118 negotiated earlier and decodes the received GTP-C/GTP-U message. Thus, the sending EPC node uses the common encryption key 120 generated using the PQPSK ID 118 to encrypt the message and the receiving EPC node uses the same common encryption key 120 generated using the PQPSK ID 118 to decrypt the message.

In the case of GTP-C IE level encryption, in the GTP-C message header the sender EPC node indicates the message is encrypted at the IE level. When sending out the message over the GTP-C interface, the EPC node sets the IE encryption flag in the GTP-C header and encrypts the value of the IE, which are exchanged in node features using the PQPSK key derives using the PQPSK ID 118 negotiated earlier using the echo request message 122 and echo response message 124. When receiving the message over the GTP-C interface, the receiving EPC node checks the IE encryption flag in the GTP-C header. If the flag is set, then the receiving EPC node decrypts the values of IE that are exchanged in node features using the PQPSK key 120 derived using the PQPSK ID 118 to decrypt the message. Thus, the sending EPC node uses the common encryption key 120 (generated using the PQPSK ID 118) to encrypt the message and the receiving EPC node uses the same common encryption key 120 (generated using the PQPSK ID 118) to decrypt the message. In configurations, the payload of the message may also be encrypted by the sending EPC node using the common encryption key 120. Thus, the receiving EPC node may decrypt the payload of the message using the common encryption key 120.

Thus, the techniques and architecture described herein provide a quantum resistant way to generate and share pre-shared keys between EPC nodes. The EPC nodes have more control in selecting messages to encrypt and the EPC nodes have more control in selecting IEs to encrypt. This may significantly reduce CPU requirements as only a few important messages are encrypted and only important IEs are encrypted. The encryption/decryption mechanism may be embedded in the GTP-C/GTP-U protocol, which increases interoperability between different vendors.

Figure 4:
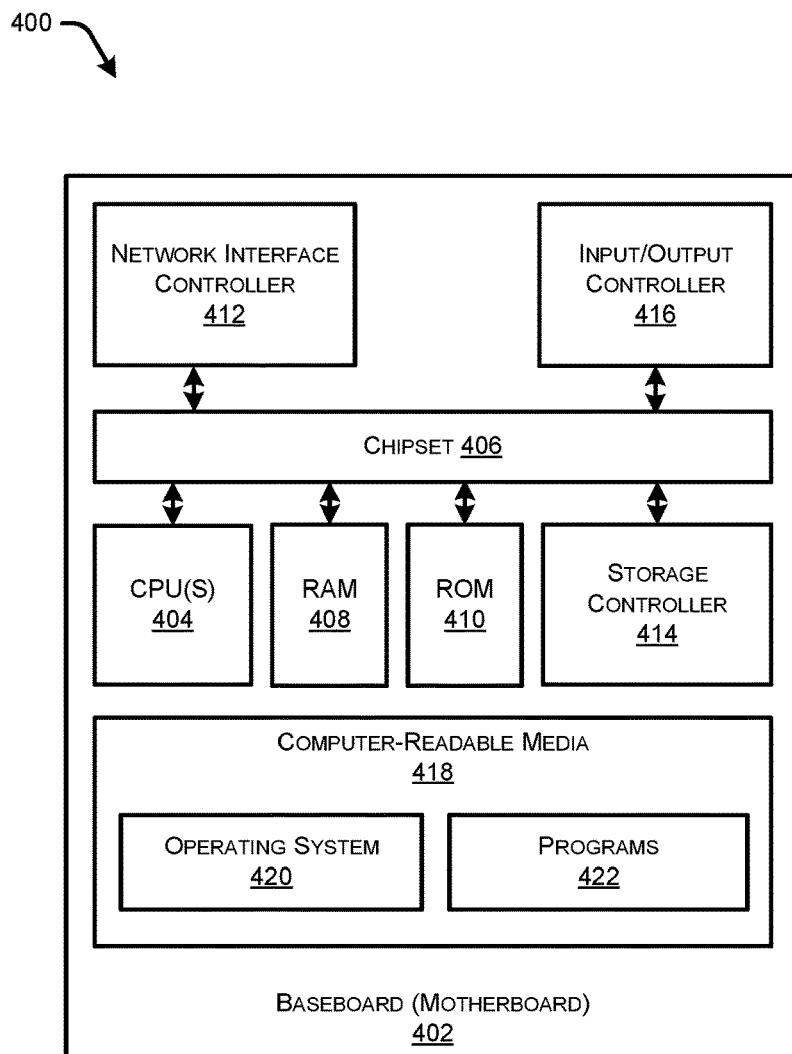
FIG. 4 is a computer architecture diagram showing an example computer hardware architecture for implementing a device that can be utilized to implement aspects of the various technologies presented herein.

FIG. 4 shows an example computer architecture for a computing device 400 capable of executing program components for implementing the functionality described above. In configurations, one or more of the computing devices 400 may be used to implement one or more of the components of FIGS. 1-3. The computer architecture shown in FIG. 4 illustrates a conventional server computer, router, switch, workstation, desktop computer, laptop, tablet, network appliance, e-reader, smartphone, or other computing device, and can be utilized to execute any of the software components presented herein. The computing device 400 may, in some examples, correspond to a physical device or resources described herein.

The computing device 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computing device 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computing device 400. The chipset 406 can further provide an interface to a computer-readable storage medium such as a read-only memory ("ROM") 410 or non-volatile RAM ("NVRAM") for storing basic routines that help to startup the computing device 400 and to transfer information between the various components and devices. The ROM 410 or NVRAM can also store other software components necessary for the operation of the computing device 400 in accordance with the configurations described herein.

The computing device 400 can operate in a networked environment using logical connections to remote computing devices and computer systems through a network, such as the example network 100. The chipset 406 can include functionality for providing network connectivity through a NIC 412, such as a gigabit Ethernet adapter. In configurations, the NIC 412 can be a smart NIC (based on data processing units (DPUs)) that can be plugged into data center servers to provide networking capability. The NIC 412 is capable of connecting the computing device 400 to other computing devices over networks. It should be appreciated that multiple NICs 412 can be present in the computing device 400, connecting the computer to other types of networks and remote computer systems.

The computing device 400 can include a storage device 418 that provides non-volatile storage for the computer. The storage device 418 can store an operating system 420, programs 422, and data, which have been described in greater detail herein. The storage device 418 can be connected to the computing device 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computing device 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 400 can further read information from the storage device 418 by detecting the physical states or characteristics of one or more particular locations within the physical storage units.

In addition to the mass storage device 418 described above, the computing device 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 400. In some examples, the operations performed by the cloud network, and or any components included therein, may be supported by one or more devices similar to computing device 400. Stated otherwise, some or all of the operations described herein may be performed by one or more computing devices 400 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computing device 400. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computing device 400.

In one embodiment, the storage device 418 or other computer-readable storage media is encoded with computer-executable instructions which, when loaded into the computing device 400, transform the computer from a general-purpose computing system into a special-purpose computer capable of implementing the embodiments described herein. These computer-executable instructions transform the computing device 400 by specifying how the CPUs 404 transition between states, as described above. According to one embodiment, the computing device 400 has access to computer-readable storage media storing computer-executable instructions which, when executed by the computing device 400, perform the various processes described above with regard to FIGS. 1-3. The computing device 400 can also include computer-readable storage media having instructions stored thereupon for performing any of the other computer-implemented operations described herein.

The computing device 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computing device 400 might not include all of the components shown in FIG. 4, can include other components that are not explicitly shown in FIG. 4, or might utilize an architecture completely different than that shown in FIG. 4.

The computing device 400 may support a virtualization layer, such as one or more virtual resources executing on the computing device 400. In some examples, the virtualization layer may be supported by a hypervisor that provides one or more virtual machines running on the computing device 400 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
generating, by a first node of a network, a random number input string:
forwarding, by the first node to a second node of the network, the random number input string:
using the random number input string, generating, by the first node, at least one first key and an associated identifier:
forwarding, by the first node to the second node, the associated identifier:
using the random number input string, generating, by the second node, at least one second key:
based at least in part on the associated identifier, selecting, by the second node, the at least one second key as a common encryption key, wherein the at least one second key and the at least one first key are identical:
encrypting, by the first node using the common encryption key, traffic destined for the second node:
decrypting, by the second node using the common encryption key, traffic received from the first node:
encrypting, by the second node using the common encryption key, traffic destined for the first node; and
decrypting, by the first node using the common encryption key, traffic received from the second node.

2. The method of claim 1, further comprising:
encrypting, by the first node using a public key of the second node, the random number input string; and
decrypting, by the second node using a private key of the second node, the random number input string.

3. The method of claim 2, further comprising:
signing, by the first node using a private key of the first node, the associated identifier with a signature; and
validating, by the second node using a public key of the first node, the signature.

4. The method of claim 1, wherein the network is configured as a general packet radio service (GPRS) tunneling protocol (GTP) network.

5. The method of claim 4, further comprising:
setting a flag in a header of a message, by the first node, wherein the flag indicates that a payload of the message is encrypted:
forwarding, by the first node to the second node, the message:
determining, by the second node, that the flag is set; and
based at least in part on determining that the flag is set, decrypting, by the second node using the common encryption key, the payload of the message.

6. The method of claim 4, further comprising:
encrypting, by the first node using the common encryption key, one or more information elements of a message:
setting a flag in a header of the message, by the first node, wherein the flag indicates that the one or more information elements of the message are encrypted:
forwarding, by the first node to the second node, the message:
determining, by the second node, that the flag is set; and
based at least in part on determining that the flag is set, decrypting, by the second node using the common encryption key, the one or more information elements of the message.

7. The method of claim 6, further comprising:
encrypting, by the first node using the common encryption key, a payload of the message:
forwarding, by the first node to the second node, the message; and
based at least in part on decrypting the one or more information elements of the message, decrypting, by the second node using the common encryption key, the one or more information elements of the message.

8. The method of claim 1, wherein:
using the random number input string, generating, by the first node, at least one first key and the associated identifier comprises generating, by the first node, multiple first keys and associated identifiers; and using the random number input string, generating, by the second node, at least one second key and the associated identifier comprises generating, by the second node, multiple second keys and associated identifiers.

9. A system comprising:
one or more processors; and
one or more non-transitory computer-readable media storing computer-executable instructions that, when executed by the one or more processors, cause the one or more processors to perform actions comprising:
generating, by a first node of a network, a random number input string:
forwarding, by the first node to a second node of the network, the random number input string:
using the random number input string, generating, by the first node, at least one first key and an associated identifier:
forwarding, by the first node to the second node, the associated identifier:
using the random number input string, generating, by the second node, at least one second key:
based at least in part on the associated identifier, selecting, by the second node, the at least one second key as a common encryption key, wherein the at least one second key and the at least one first key are identical:
encrypting, by the first node using the common encryption key, traffic destined for the second node:
decrypting, by the second node using the common encryption key, traffic received from the first node:
encrypting, by the second node using the common encryption key, traffic destined for the first node; and
decrypting, by the first node using the common encryption key, traffic received from the second node.

10. The system of claim 9, wherein the actions further comprise:
encrypting, by the first node using a public key of the second node, the random number input string; and
decrypting, by the second node using a private key of the second node, the random number input string.

11. The system of claim 10, wherein the actions further comprise:
signing, by the first node using a private key of the first node, the associated identifier with a signature; and
validating, by the second node using a public key of the first node, the signature.

12. The system of claim 9, wherein the network is configured as a general packet radio service (GPRS) tunneling protocol (GTP) network.

13. The system of claim 12, wherein the actions further comprise:
setting a flag in a header of a message, by the first node, wherein the flag indicates that a payload of the message is encrypted:
forwarding, by the first node to the second node, the message:
determining, by the second node, that the flag is set; and
based at least in part on determining that the flag is set, decrypting, by the second node using the common encryption key, the payload of the message.

14. The system of claim 12, wherein the actions further comprise:
encrypting, by the first node using the common encryption key, one or more information elements of a message:

setting a flag in a header of the message, by the first node, wherein the flag indicates that the one or more information elements of the message are encrypted:
forwarding, by the first node to the second node, the message:
determining, by the second node, that the flag is set; and
based at least in part on determining that the flag is set, decrypting, by the second node using the common encryption key, the one or more information elements of the message.

15. The system of claim 14, wherein the actions further comprise:
encrypting, by the first node using the common encryption key, a payload of the message:
forwarding, by the first node to the second node, the message; and
based at least in part on decrypting the one or more information elements of the message, decrypting, by the second node using the common encryption key, the one or more information elements of the message.

16. The system of claim 9, wherein:
using the random number input string, generating, by the first node, at least one first key and the associated identifier comprises generating, by the first node, multiple first keys and associated identifiers; and
using the random number input string, generating, by the second node, at least one second key and the associated identifier comprises generating, by the second node, multiple second keys and associated identifiers.

17. One or more non-transitory computer-readable media storing computer-executable instructions that, when executed by one or more processors, cause the one or more processors to perform actions comprising:
generating, by a first node of a network, a random number input string:
forwarding, by the first node to a second node of the network, the random number input string:
using the random number input string, generating, by the first node, at least one first key and an associated identifier;
forwarding, by the first node to the second node, the associated identifier:
using the random number input string, generating, by the second node, at least one second key:
based at least in part on the associated identifier, selecting, by the second node, the at least one second key as a common encryption key, wherein the at least one second key and the at least one first key are identical:
encrypting, by the first node using the common encryption key, traffic destined for the second node:
decrypting, by the second node using the common encryption key, traffic received from the first node:
encrypting, by the second node using the common encryption key, traffic destined for the first node; and
decrypting, by the first node using the common encryption key, traffic received from the second node.

18. The one or more non-transitory computer-readable media of claim 17, wherein the network is configured as a general packet radio service (GPRS) tunneling protocol (GTP) network and the actions further comprise:
setting a flag in a header of a message, by the first node, wherein the flag indicates that a payload of the message is encrypted:
forwarding, by the first node to the second node, the message:
determining, by the second node, that the flag is set; and based at least in part on determining that the flag is set, decrypting, by the second node using the common encryption key, the payload of the message.

19. The one or more non-transitory computer-readable media of claim 17, wherein the network is configured as a general packet radio service (GPRS) tunneling protocol (GTP) network and the actions further comprise:
- encrypting, by the first node using the common encryption key, one or more information elements of a message;
- setting a flag in a header of the message, by the first node, wherein the flag indicates that the one or more information elements of the message are encrypted;
- forwarding, by the first node to the second node, the message;
- determining, by the second node, that the flag is set; and
- based at least in part on determining that the flag is set, decrypting, by the second node using the common encryption key, the one or more information elements of the message.

20. The one or more non-transitory computer-readable media of claim 19, wherein the actions further comprise:
- encrypting, by the first node using the common encryption key, a payload of the message;
- forwarding, by the first node to the second node, the message; and
- based at least in part on decrypting the one or more information elements of the message, decrypting, by the second node using the common encryption key, the one or more information elements of the message.

* * * * *